United States Patent [19]

de Senneville

[11] 4,124,256
[45] Nov. 7, 1978

[54] COMBINED RADIAL AND AXIAL BEARING

[75] Inventor: Bernard de Senneville, Neuilly sur Seine, France

[73] Assignee: Nadella, Rueil-Malmaison, France

[21] Appl. No.: 763,640

[22] Filed: Jan. 28, 1977

[30] Foreign Application Priority Data

Jan. 29, 1976 [FR] France ............................. 76 02358

[51] Int. Cl.² .................................................. F16C 19/04
[52] U.S. Cl. ................................................................. 308/174
[58] Field of Search ................... 308/174, 207 R, 208, 308/219

[56] References Cited

U.S. PATENT DOCUMENTS

| 3,467,453 | 9/1969 | Spencer et al. | 308/174 |
| 3,640,573 | 2/1972 | Safar | 308/174 X |
| 3,738,718 | 6/1973 | Jacob et al. | 308/174 |
| 3,930,692 | 1/1976 | Condon, Jr. et al. | 308/174 |
| 3,934,956 | 1/1976 | Pitner | 308/174 |
| 3,972,574 | 8/1976 | Pitner | 308/219 X |

FOREIGN PATENT DOCUMENTS

| 1,150,412 | 8/1957 | France | 308/174 |
| 1,295,977 | 5/1962 | France | 308/174 |

Primary Examiner—Stephen G. Kunin
Attorney, Agent, or Firm—Littlepage, Quaintance, Murphy, Richardson and Webner

[57] ABSTRACT

Provided herein is a combined radial and axial bearing wherein one or both axial bearings are attached to the end faces of the radial bearing bushing to form a monoblock unit bearing which has the advantages of simplyfing tolerances, compensation for differential expansion and handling and mounting.

6 Claims, 6 Drawing Figures

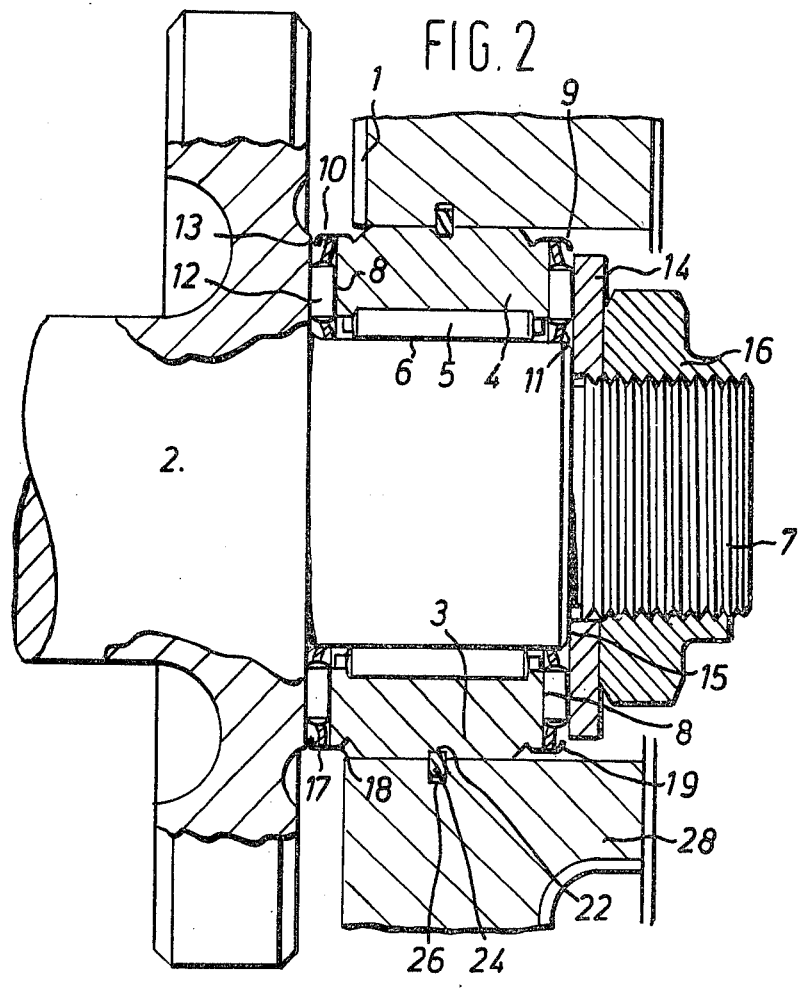
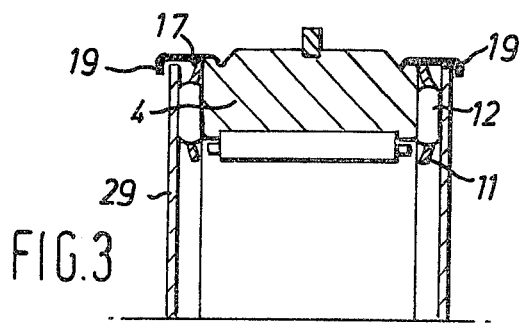

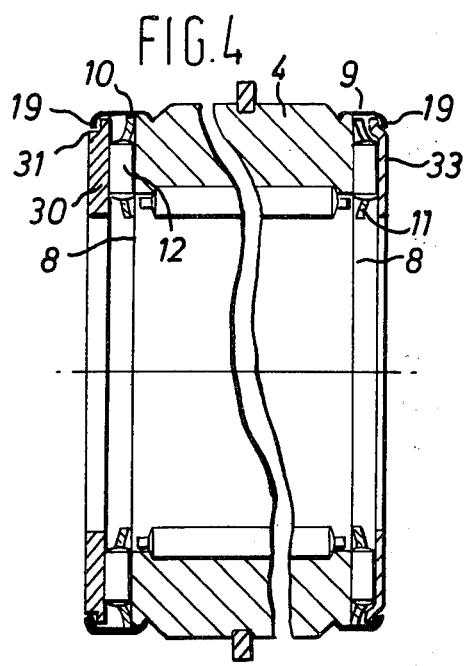
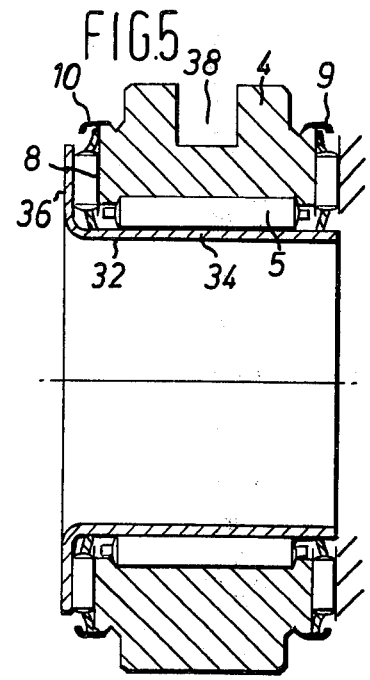
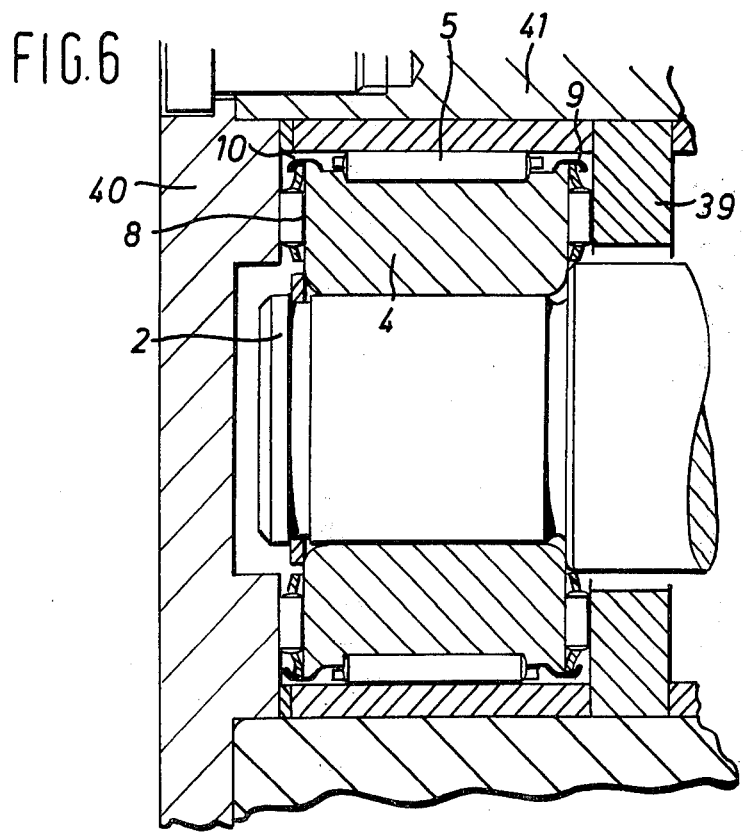

COMBINED RADIAL AND AXIAL BEARING

This invention relates to a radial and axial bearing commonly called a combined bearing.

Such combined bearings and more particularly those using rollers or needles are advantageously used whenever it is desirable to separate the function of a radial bearing from that of an axial bearing.

In effect, in such combined bearings, separation of the two bearing functions enables dissociation of the play affecting each of the portions fulfilling a function thus preventing the appearance of axial play due, for example, to differential expansion of a bearing having integrated functions and its housing, from bearing transformed into radial play.

Such combined units are already known to be formed by an assembly of a radial bearing and an axial bearing respectively designed to bear radial and axial loads in a given direction. These bearings are conceived to withstand axial loads in a single direction which generally necessitates the addition of a separate axial bearing to contain axial thrusts in two opposing directions.

It is also known to obtain the afore-mentioned results by using three bearings instead of two with one radial bearing and two axial bearings. The use of two or more bearings presents a certain number of disadvantages amongst which the following can be mentioned:

difficulties in maintaining the tolerances of the members of the different bearings and those of their housings;

necessity of providing compensation for possible differential expansions of the members of the different bearings and their different housings which may be made of different materials; and difficulty in handling and mounting, more particularly on large production lines such as those of the automobile industry.

According to the present invention a combined radial and axial bearing has a radial bearing bushing with axial bearing races carried by end faces of the bushing, two sets of caged axial bearing rolling elements and annular ferrules, each shaped to co-operate with and retain one of the caged sets, respectively attached to a surface of the bushing proximate one end thereof, so that both caged sets are assembled with the bushing to obtain a monobloc bearing unit prior to mounting the bearing for use.

It is clear that the present invention enables a combined bearing to be obtained having a monobloc unit of a radial bushing and two caged sets of axial bearing rolling elements, which considerably simplifies handling and mounting.

It will be noted, in other respects, that in such a bearing it is advisable to maintain only one principal tolerance, that relating to the thickness of the radial bushing which may comprise both axial or thrust bearings and hence manufacture is therefore simpler and less costly.

In an embodiment of the invention, the radial bearing bushing is a cylindrical, exterior bushing, the external surface of which is shaped proximate each end thereof to co-operate with a ferrule that has a U-shaped channel section, one arm of which engages the shaped cylindrical surface and the other arm of which retains and encases the exterior periphery of the caged axial bearing rolling elements. The bushing has a channel about its exterior surface to co-operate with locking means to lock the bushing in a housing.

An annular backing plate may be trapped under the other arm of the ferrule to form a bearing race.

Additionally, the bearing may have a further cylindrical bushing sleeve with an outwardly flanged end to form an inner radial bearing race and a bearing race for one of the axial bearings respectively.

The invention is illustrated, by way of example, on the accompanying drawings wherein:

FIG. 2 is an enlarged section of the bearing of FIG. 1;

FIG. 3 is a sectional view of a bearing incorporating axial backing plates;

FIG. 4 is a section of a bearing, longitudinally split to show two forms of co-operation between ferrules and backing plates;

FIG. 5 is a section of a bearing incorporating an inner radial bearing race sleeve; and FIG. 6 is a section of an installed bearing having an interior radial bearing bushing.

Figure 1:
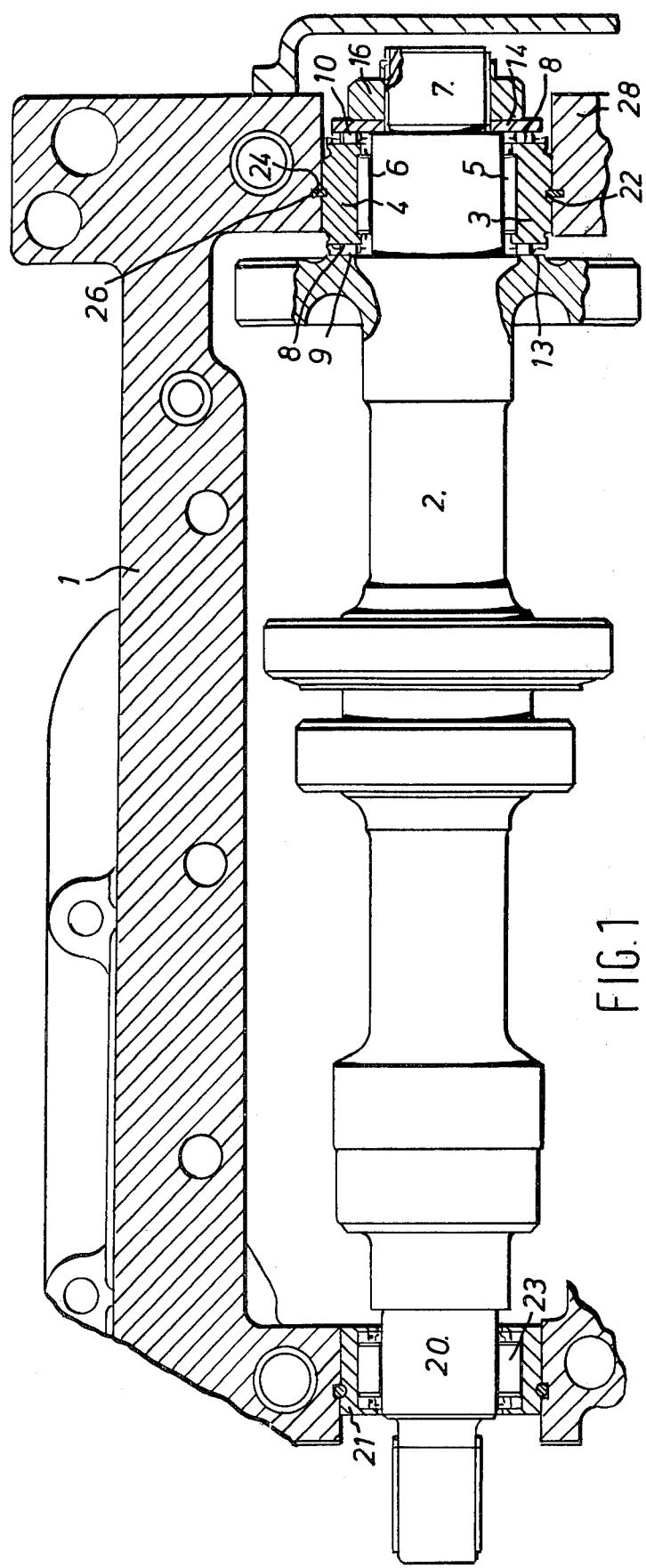
FIG. 1 is a section of a gearbox with a bearing in accordance with the invention installed and supporting one end of a shaft.

FIGS. 1 and 2 show, as an example, a part view of a gearbox 1 having a shaft 2 supported at one end by a combined bearing unit 3 and comprising a cylindrical bushing 4 forming the exterior bearing race of a radial bearing 5 of caged rollers or needles, the interior race of which is carried by a portion 6 of the shaft 2. The end faces 8 of the bushing 4 each carry a bearing race for axial thrust bearings 9 and 10 formed of a cage 11 for holding bearing elements, such as rollers 12, the second races of the axial bearings 9 and 10 being formed respectively by a shoulder 13 carried by the shaft 2 and a back plate 14 immobilised between a second shaft shoulder 15 and a clamping device 16 mounted on the end 7 of the shaft 2.

A ferrule 17 of U-shaped channel section and having one arm 18 fixed, by welding for example, onto the body of the bushing 4 and the other arm 19 as a radial flange to trap and retain the exterior peripheries of the caged rollers 12 is carried by each of the faces 8 with the corresponding axial thrust bearings 9 and 10, and forms a combined monobloc bearing capable of withstanding axial loads in two opposing directions.

In an unillustrated embodiment, the ferrule 17 can be fixed onto a portion of the bushing situated beside the portion of the shaft 6 so that the radial flange 19 no longer encases the exterior periphery, but the interior periphery, of the thrust bearing.

Fixing of the ferrule onto the bushing can be carried out by any known means, such as by brazing or clipping-on.

In the arrangement described, the bearing unit 3, which forms a monobloc unit in the sense that it can be handled, mounted and removed as a single member, is, when it is combined with a simple radial bearing 21, an advantageous replacement of the known method of mounting a gear box shaft on two separate bearings each of which has to withstand radial as well as axial loads. This gives greater ease of handling and mounting and a certain saving in manufacture, as in the bearing according to the present invention it is sufficient to principally maintain the tolerances relating to the axial thickness of the bushing, which may be fitted with its two thrust bearings 9 and 10.

The bearing bushing 4 has a groove 22 which receives a ring 24 designed to co-operate, in known manner, with a second groove 26 machined in a housing 28 to coaxially immobilise or lock the bearing unit in the housing. Such immobilisation could be obtained by any other equivalent means, as for example by a cover bearing against a shoulder provided on the bushing.

Preferably each bearing will have two ferrules, one to be used for each of the two thrust bearings 9 and 10; however, the use of a single ferrule can be envisaged whenever permitted by the immobilisation device adopted.

Other parts of the gear box 1 are in accordance with common known techniques and, not being part of the invention, are illustrated by FIG. 1, but are not described. However, it is to be noted that the other end 20 of the shaft 2 (opposite to end 7) is supported by a conventional radial bearing 21 having cylindrical rollers 23.

FIG. 3 shows a variant of the bearing unit according to the invention in which the thrust bearings 9 and 10 are each formed by a unit comprising a cage 11 and rollers 12 and an annular back plate 29 assembled, by the use of the ferrule 17, with the corresponding bearing race on the bushing 4.

According to the application for which the bearing is designed, either an arrangement with two thrust bearings (as shown) or a single thrust bearing provided with an incorporated back plate may be used.

FIG. 4 shows, at the left-hand side a variant of FIG. 3 in which one or both of the two thrust bearings has an incorporated thick annular back plate 30 provided about its outer rim with a radial cut-away 31 designed to receive the radial flange 19 of the ferrule so as to reduce any friction in operation. The back plate 30 can be inbuilt against the shoulder 13 without being incorporated in the thrust bearing, in which case it is advantageous for it to have a cutaway beside its face which serves as bearing race.

The right hand side of FIG. 4 shows another variant in which a thin back plate 33 has its outer rim curved towards the inside of the thrust bearing also to reduce any friction with the radial flange 19 of the ferrule.

FIG. 5 shows another bearing unit according to which the internal bearing race of the radial bearing 5 and of one of the axial thrust bearings 9 or 10 is formed in a single piece 32 in the form of a sleeve having an axial portion 34 and an outward radial flange 36. According to this variant, the thrust bearings extend radially over a distance of less than the maximum radial thickness of the bushing 4, the central part of which has a slot 38 designed to co-operate with immobilisation or locking means, such as a cotter pin for example, to fix the bushing in the housing. Other arrangements in which at least one of the thrust bearings extends radially over a distance greater than the radial thickness of the bushing can also be provided.

For reasons of simplicity in manufacture, the bushing 4 carrying the thrust bearing races is advantageously made in a single piece. However, for bearing units according to the invention which are particularly small or particularly large, it may prove necessary to provide one or both thrust bearings with a built-in bearing race on one or both radial faces of the bushing.

According to FIG. 6, the bushing 4 is no longer formed by the exterior bushing, but by the interior bushing of the radial bearing 5 mounted for example on the turning shaft 2, each of the lateral faces 8 of which bears through the intermediary of thrust bearings 9 and 10 respectively against first and second shoulders 39 and 40 connected to a gear case 41.

Generally the radial bearing 5 is a needle bearing whilst the thrust bearings 9 and 10 can be needle or roller bearings.

I claim:

1. A combined radial and axial bearing assembly comprising a bushing having an inner cylindrical surface forming a race for radial bearing elements, and flat end faces forming races for axial bearings, an outer peripheral surface for mounting in a supporting housing, axial bearing elements engaging said end bearing surfaces, each axial bearing including a cage for said bearing elements, a ferrule for each axial bearing engaging the end of said bushing inwardly of said peripheral surface and extending axially outwardly and radially inwardly from said bushing to form a radial arm, said arm extending over the cage of said axial bearing and retaining said bearing on the race on the end of said bushing, said ferrules lying within the outer peripheral surface of said bushing and said bearing faces lying inwardly of said peripheral surface.

2. A bearing as claimed in claim 1, wherein at least one of the axial bearings extends radially over a smaller distance than the radial thickness of said bushing.

3. A bearing as claimed in claim 1 wherein each ferrule is a U-shaped channel section, said ferrules having the other arms of said ferrules engaging in grooves formed in the exterior peripheral surface of said bushing so that each ferrule encases the exterior periphery of the respective set of caged axial bearing rolling elements.

4. A bearing as claimed in claim 3, wherein said bushing has a channel about its exterior surface to co-operate with locking means to lock said bushing in a housing.

5. A shaft mounting in which a combined radial and axial bearing assembly supports a shaft in a machine and in which the bearing assembly can be assembled as a unit prior to mounting of the assembly in a machine and in which all tolerances are set prior to mounting, said assembly comprising:

(A) A cylindrical shaft having:
1. A first section
2. A second section having a diameter smaller than the first section
3. A first shoulder between the first and second sections of the shaft
4. A third section having a diameter smaller than the second section
5. A second shoulder between the second and third sections of the shaft (B) A cylindrical bushing surrounding the second section of the shaft, said cylindrical bushing having:
1. A cylindrical depression adapted to receive a plurality of radial rolling elements
2. A first axial bearing face juxtaposed from the first shoulder of the shaft
3. A second axial bearing face parallel to the first axial bearing face
4. Means for fixedly attaching the bushing to the machine, including an axial peripheral surface to engage a complementary surface on said machine, said peripheral surface of said bushing being radially outward of said axial bearing faces (C) A plurality of radial rolling elements between the second section of the shaft and the cylindrical depression of the bushings (D) A disc shaped back plate resting against the second shoulder of the shaft and fixedly held by a nut on the third section of the shaft (E) A plurality of caged axial rolling elements between the first shoulder of the shaft and the first axial bearing face of the bushing (F) A plurality of caged axial rolling elements between the disc shaped back plate and the second axial bearing face of the bushing (G) Means carried by the bushing for holding the caged axial rolling elements in place prior to and during mounting of the assembly in the machine, said means lying radially inwardly of said peripheral surface of said bushing and extending over said caged axial elements.

6. A combined radial and axial bearing having a cylindrical radial bearing bushing with an exterior cylindrical surface, axial bearing races carried by end faces of said bushing, two sets of caged axial bearing rolling elements, annular back plates for said sets of axial bearing elements, each forming a bearing race for one set of elements, and annular ferrules, each shaped to cooperate retainingly with one of said sets of axial bearing rolling elements and attached to the exterior surface of said bushing proximate an end face thereof, said ferrules having a U-shaped channel section, one arm of which is attached to the exterior surface of said bushing and the other arm of which retains one of said back plates and set of caged axial bearing elements, each of said annular back plates having a radially cut-away rim to receive the arm of the ferrule, whereby both sets of caged axial bearing rolling elements are assembled with the bushing to obtain a monobloc unit bearing prior to mounting the bearing for use.

* * * * *